United States Patent Office 2,950,524
Patented Aug. 30, 1960

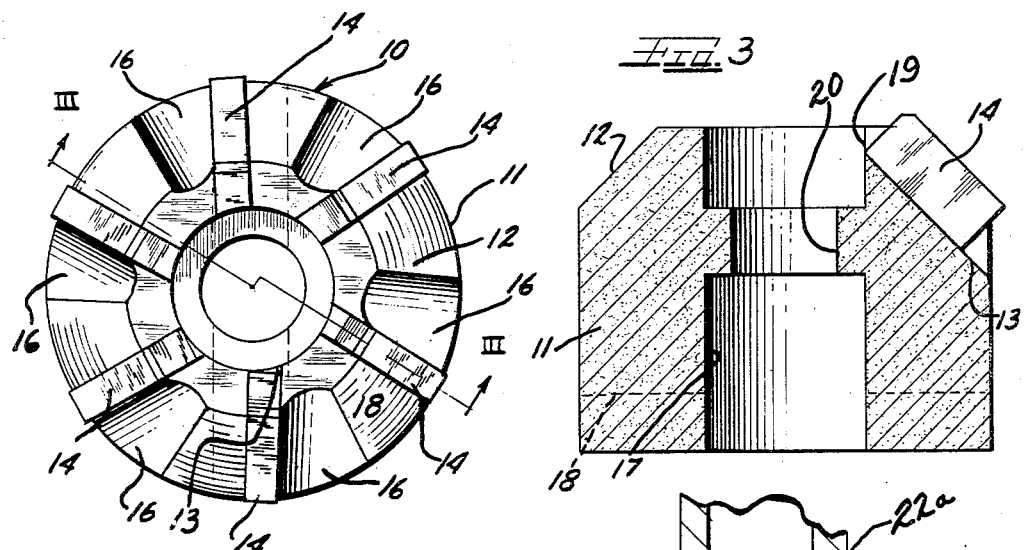
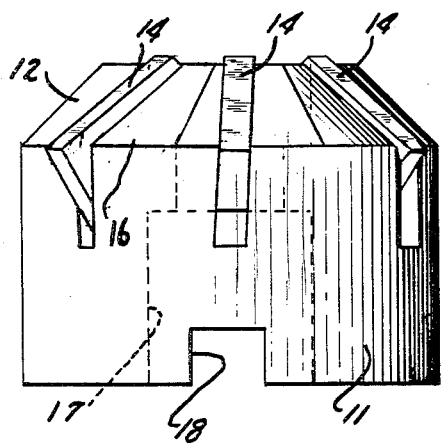
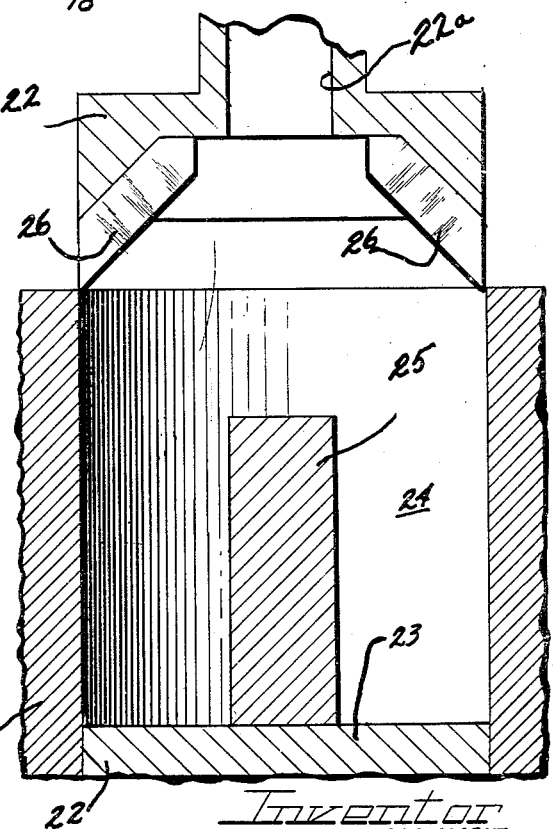

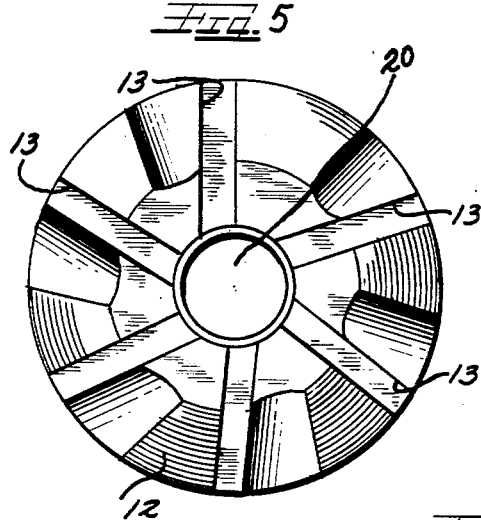
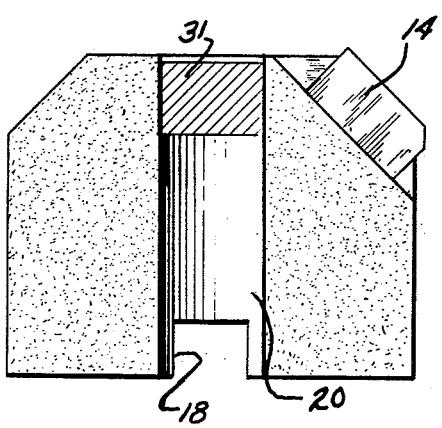
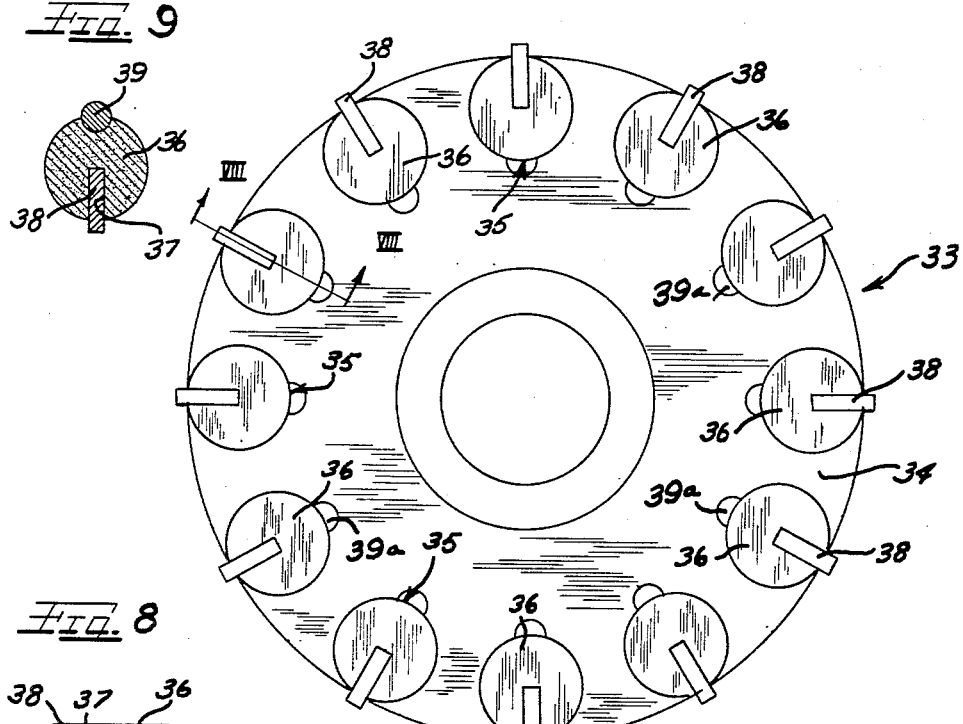
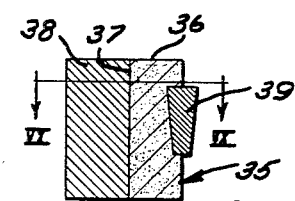

2,950,524

MEANS FOR MOUNTING CUTTER BITS
OR BLADES

Horace A. Frommelt, Chicago, and Fred Aberlin, Hainesville, Ill., assignors, by mesne assignments, to John A. Bitterli, Chicago, and William G. Hessler, La Grange, Ill., and Horace A. Frommelt, Philadelphia, Pa., as trustees Filed June 2, 1955, Ser. No. 512,604

4 Claims. (Cl. 29—96)

The present invention is directed to an improved cutting tool, and to cutting assemblies, as well as to methods for the manufacture of products of this type.

One of the principal difficulties in the manufacture of cutting tools employing hard metal cutting elements such as tungsten carbide, titanium carbide, high speed steel, alloys, or similar cutting elements occurs in properly mounting the cutting elements in the face of the tool. Raw carbide bits as they are received from the manufacturers have relatively coarse, and non-planar surfaces which, in prior practice, are invariably ground down by means of diamond abrading tools or the like to produce as smooth a surface on the bit as possible. The reason for this lies in the fact that the cutter bits are commonly disposed in the face of the cutting tool and held therein by means of wedge or clamping elements which engage two or more surfaces of the cutter bit with sufficient pressure to hold the cutter bit in place in the face of the tool. Because of the extremely brittle nature of the carbide bits, any surface irregularities on the bits promote their fracture. Hence, it is presently common practice to grind these bits down in an expensive operation in order to minimize the danger of breakage. This time consuming step also adds substantially to the cost of the tool, as it is estimated that the grinding operation increases the cost of using the bit by a factor of about 3 times over the price of the raw bit.

Since the cost of the ground carbide bit was a substantial portion of the cost of the finished cutting tool, it was deemed necessary, in prior practice, to resurface the bit when it became dull in order to provide as long a useful life as possible for the expensive bit. This meant removing the bits from the cutting tool, resurfacing with an expensive diamond grinding operation and then re-aligning and readjusting the bits in the face of the tool. Thus, the cost of using the tool included not only the original high cost of the tool but also the substantial refinishing operations necessary throughout the useful life of the tool.

From an operational point of view, the prior means for securing the carbide bits in place has further disadvantages. For one, the clamping means themselves occupy a substantial portion of the area on the cutting face of the tool so that the number of cutting bits which can be spaced around a given diameter of tool face is inherently limited by the necessity of providing adequate clamping means. For another, the clamping means presently employed are comparatively resilient so that they vibrate during the cutting operation. These vibrations, however, do not occur at the same frequency as the vibrations of the cutting element itself with the result that stresses are set up in the tool which tend to decrease the useful life of the cutting element.

With the foregoing in mind, an object of the present invention is to provide an improved cutting tool which eliminates all of the disadvantages of the presently used means for mounting the cutting elements.

Another object of the invention is to provide an improved cutting tool in which the metal of the tool holder itself rigidly clamps the cutting element in position without the necessity of extraneous clamping means being provided.

Still another object of the invention is to provide an improved cutting tool which employs the raw carbide, without the necessity of the expensive grinding operation.

A further object of the invention is to provide a carbide cutting tool which is sufficiently cheap so that it is economical to dispose of the tool when the cutting edge becomes dull, rather than attempt to resurface the cutting element.

A still further object of the invention is to provide a cutting tool wherein a hard cutting element is held in place in a cutter body comprising a matrix of compacted sintered powdered metal.

These and other objects of the invention are achieved by providing, as a matrix for the cutting element, a powdered metal compact having certain characteristics. In the preferred embodiment of the present invention, the matrix has a strength sufficient to withstand the stresses which it encountered during the cutting operation, and a coefficient of thermal expansion such that it can, by virtue of its own expansion, put the cutting element in a state of compression with equal force being applied on all sides. The matrix is further characterized by a substantial lack of resiliency, i.e., the metal is "dead" so that it minimizes the vibrational effects which previously reduced the effective life of carbide tools. In addition, the preferred matrices of the invention are oxidation resistant at the temperatures to which the tool holder is designed to operate.

While many different types of matrices may be employed, we prefer to use a powdered metal skeleton composed of iron, iron alloys, or similar ferrous base materials, for reasons of economy. Other metals, such as tungsten, nickel, cobalt, and the like can be employed but any advantages to be gained from the use of these metals are frequently more than offset by the increased cost involved.

The usability of a given metal compact for this purpose depends substantially upon its coefficient of thermal expansion as, in order to hold the cutting element rigidly in place, the metal of the matrix should expand for a given temperature range to a substantially greater extent than the material of the cutting element. When the mate- has cooled, it should retain dimensions which are greater than its regional dimensions before expansion. For this reason, we prefer, when using powdered iron compacts, to increase the coefficient of thermal expansion by infiltrating the powdered ferrous compact with a metal such as copper. The addition of copper has the further advantages of increasing the strength, and the oxidation resistance of the material.

A further description of the present invention will be made in conjunction with the attached sheets of drawings which illustrate a preferred embodiment thereof.

In the drawings:

Figure 1 is a plan view of the face of a cutting tool produced according to the present invention;

Figure 2 is a view in elevation of the cutting tool shown in Figure 1;

Figure 3 is a cross-sectional view taken substantially along the line III—III of Figure 1;

Figure 4 is an exploded view of a molding assembly which may be employed in the formation of the tools of the present invention;

Figure 5 is a plan view of the face of the compact produced by the molding operation illustrated in Figure 4;

Figure 6 is a cross-sectional view of the compact after insertion of the cutting elements, and just prior to impregnation of the compact;

Figure 7 is a plan view of a milling cutter embodying a modified form of cutting element;

Figure 8 is a cross-sectional view taken substantially along the line VIII—VIII of Figure 7; and Figure 9 is cross-sectional view taken along the line IX—IX of Figure 8.

As shown in the drawings:

In Figure 1, reference numeral 10 indicates generally a cutting tool produced according to the present invention and including a solid matrix 11 forming the body of the tool. The cutting face of the tool 10 includes a beveled edge 12 in which are formed a plurality of spaced grooves 13, the grooves 13 in the particular tool illustrated, being offset from the radius of the cutting face to provide a negative rake cutter element.

Tightly received within each of the grooves 13 are a series of generally rectangular cutting elements 14 composed of a suitable carbide cutting material. As previously brought out, th unique characteristics of the matrix 11 make it possible to employ the carbide cutting elements or blades 14 in their raw, unground form, thereby effecting a substantial economy in the manufacture of the cutting tool without sacrificing performance.

The face of the cutting tool 10 also includes a plurality of spaced clip grooves 16 for accommodating cuttings produced during operation of the tool.

The interior of the tool 10 includes an axial enlarged bore 17, a central bore 20, an enlarged upper bore 19, and a keyway 18 for attachment to a spindle or the like.

The tools of the present invention may be made in any of variety of processes. However, we prefer to employ a molding process for forming the compact initially, and a typical process is illustrated schematically in Figures 4 to 6 of the drawings. In Figure 4, there is shown a mold 21 receiving an upper punch member 22 and a lower punch member 23. A molding cavity 24 is defined between the two relatively movable punch members. A core rod 25 is carried by the lower punch 23 and is slidably received in a bore 22a of the upper punch member 22.

The formation of the cutting face of the tool, or more specifically, the grooves for receiving the cutting elements is provided by means of a plurality of spaced ribs 26. When the proper amount of powder has been introduced into the molding cavity 24, the punch members 22 and 23 are moved toward each other thereby compressing the powder and forming the grooves 13 in the face of the tool. It will be understood that the upper punch member 22 also includes surfaces designed to provide the chip grooves 16 in the face of the tool, but these have been eliminated from the showing of Figure 4 for purposes of clarity.

The powder introduced into the molding cavity 24 preferably has a particle size ranging from about finer than 100 mesh to about 325 mesh or finer. We may use pure iron powder, or a small amount of carbon may be added to the iron powder being compressed. Preferably, we include a small amount of copper in the iron power, usually on the order of about 7%.

The initial compact or "green" compact produced by compaction of the powder in the molding cavity 24 has a consistency resembling that of a writing chalk or crayon, in that it is self-sustaining enough to be handled but will chip or flake off under impact. After the compact is removed from the molding cavity, it has the appearance indicated in Figure 5 of the drawings, with a plurality of slots 13 extending in the desired orientation across the cutting face of the tool. Next, the cutting carbide blades 14 may be inserted by hand into the grooves 13 in snugly fitting relationship. When this has been done, the compact may be given an initial sintering temperature of about 800° to 1100° C. to consolidate the skeleton and make it considerably stronger. Next a slug of copper 31 or copper alloy is introduced into the hollow bore 20 of the compact and the entire assembly is subjected to temperatures above the melting point of the copper infiltrant in order to cause the molten cuprous infiltrant to be adsorbed within the pores of the porous iron compact. Normally, temperatures of about 1100 to 1200° C. will be employed for infiltration, and it is desirable to carry out this step in a protective, non-oxidizing atmosphere. The techniques employed in infiltration of ferrous compacts with copper are well known, and the foregoing has been cited merely by way of example.

Alternatively, the sintering and the infiltration can be combined as a single operation, since the sintering temperature for the iron compact is approximately the same as that required for the infiltration with the cuprous infiltrant.

After cooling, the copper solidifies within the pores of the ferrous compact to produce a matrix having substantially no porosity, i.e., the matrix is about 100% dense. While the amount of copper introduced by infiltration may vary somewhat, we prefer to employ a sufficient amount of copper to produce a copper content of about 20% in the final product, the balance being iron plus whatever alloy ingredients have been added to the iron or to the copper.

If desired, the copper infiltrated skeleton can then be subjected to other heat treatment steps such as solution heat treating, precipitation hardening, or the like in order to improve the machineability, change the ductility, or for similar reasons.

In cooling down, the copper infiltrated ferrous skeleton contracts or shrinks about the carbide blades 14 so that equal pressures are applied on all sides of the blade. The resulting pressure is sufficient to put the blade 14 in compression, a highly desirable result from an operational standpoint. Since the amount of contraction on cooling is limited by the pressure of the cutting blades, the final dimensions of the cutter are somewhat greater than the dimensions of the original compact.

After cooling the compact may be machined to provide the enlarged bores 17 and 19 at opposed ends of the tool, since it is impractical to form these bores in the initial molding.

One of the many advantages of the present invention resides in the fact that the type of matrix employed to hold the carbide cutting element permits the design of rather unique types of cutting tools. One of these is illustrated in Figures 7–9 of the drawings wherein a milling cutter 33 is shown as including a cylindrical body 34 which has sockets therein for receiving tightly a plurality of circumferentially spaced cutting elements 35. As best seen in Figures 8 and 9, the cutting elements 35 include a cylindrical body portion 36 having a slot 37 extending radially therein to receive a carbide cutting blade 38. The body portion 36 is composed of a powdered metal compact, or an infiltrated compact. The end of the cutting blade 38 extends slightly beyond the periphery of the cylindrical body portion 36, as best seen in Figure 9 of the drawings.

In order to lock the cutting elements 35 in the body portion 34, each of the cutting elements 35 may be provided with a tapered locking pin 39 which is received in wedged engagement in suitable slots 39a provided in the body portion 34.

With the arrangement shown in Figure 7, the cutting elements 35 can be oriented in any desired position to provide the cutting characteristics desired. In other words, the angles of the blades with respect to the axis of the tool can be varied at will depending upon the particular cutting job involved.

While the foregoing description has dealt to a large extent with the use of infiltrated powdered metal compacts, tools possessing at least some of the many advantages of the described tools can be prepared from other powder metal compositions such as the recently developed combination of powdered metal and a synthetic resin known under the trade name "Devcon." With this type of composition, no heat is required to consolidate the compact, since the consolidation and the shrinkage occur by virtue of the setting or solidification of the resin.

The tools of the present invention provide an inexpensive substitute for the types of cutting tools presently being employed. Among the numerous advantages of the tool is the fact that the matrix is substantially non-resilient, thereby minimizing the vibration of the cutting element which is detrimental to long cutter life.

The use of the improved matrix of the invention also makes possible the design of more efficient cutter tools in that with the type of cutting element herein described, about three to four times the number of cutting elements can be included in a given diameter cutter body than has heretofore been possible.

In addition, the cost of the tool is materially decreased, since the cost of a new cutter element is frequently less than the cost of regrinding a carbide blade, making it economically feasible to discard and replace the cutter after the blade becomes dull rather than try to resurface it. Additional savings are provided because the raw carbide blade need not be ground initially before being used in the cutting tool. This advantage not only saves money but also results in better performance in the tool.

The milling cutter shown in Figures 7 to 9 utilizes cutting elements in which a single cutting blade is received in its own individual matrix. This is a specific example of an important aspect of the invention which is broadly utilized in the field of single point cutting tools. Such tools, for example, find use in lathes, planers, boring mills, and the like.

The ability of the matrix to hold securely small cutting blades of any shape or thickness opens up wide new fields of application in the cutting tool field. For the first time, as far as we are aware, it is now possible to make a practical circular cutting saw using carbide cutting elements.

Composite cutting tools also can be made from the type of cutting elements described herein. For example, a form cutter or a slab mill of any desired contour can be built up by securing together a member of disc-like sections in the desired orientation, each of the sections including cutting elements arranged in the desired fashion about the periphery of the section.

As a further modification, an annular cutter can be built up from segmented cutting sections by clamping or otherwise securing each of the sections together.

End mills provide a still further example of tools which may include the improved cutting elements of the present invention. Still another field of application is that of drills of various description in which one or more cutting elements are embedded in the powdered metal matrix.

It will be evident that various modifications can be made to the described embodiments without departing from the scope of the present invention.

We claim as our invention:

1. A cutting tool wherein a hard cutting element is held in place in a cutter body by internal compressive force of the material of the body, said body comprising a matrix of compacted sintered powdered metal, and a hard cutting element embedded in said matrix and projecting partially therefrom, said matrix having a coefficient of thermal expansion sufficiently greater than that of said cutting element so that said matrix locks said cutting element in place by virtue of the compressive force exerted by said matrix on said cutting element.

2. A cutting tool comprising a raw and unground carbide cutting element embedded in a matrix comprising a sintered ferrous powdered metal compact and projecting partially therefrom, said matrix having a coefficient of thermal expansion sufficiently greater than that of said cutting element so that said matrix holds said cutting element rigidly in place by shrinkage of said matrix about said cutting element, thereby holding said cutting element in compression.

3. A cutting tool comprising a tool body having cylindrical sockets therein, a plurality of cylindrical, sintered ferrous compacts each having an axially extending slot therein opening from the periphery of the compact and a hard cutting element fixed within said slot and projecting partially from the compact, said compacts being removably locked into said tool body sockets but with the projecting portions of the elements projecting from the body and said compacts having a coefficient of thermal expansion sufficiently greater than that of said cutting element so that the metal of said compact compresses said cutting element laterally in said slot.

4. A cutting tool comprising a cylindrical, sintered copper infiltrated ferrous compact having an axially extending slot therein and a hard cutting element received within said slot and partially projecting therefrom, said compact having a coefficient of thermal expansion sufficiently greater than that of said cutting element so that said compact compresses said cutting element and holds said element rigidly in said slot.

References Cited in the file of this patent

UNITED STATES PATENTS

| | | |
|---|---|---|
| 1,043,831 | Heinkel et al. | Nov. 12, 1912 |
| 1,090,533 | Heinkel | Mar. 17, 1914 |
| 1,148,597 | Lewis | Aug. 3, 1915 |
| 1,223,654 | Allingham | Apr. 24, 1917 |
| 1,267,782 | McKerahan | May 28, 1918 |
| 1,547,839 | Steenstrup | July 28, 1925 |
| 1,830,179 | Stowell | Nov. 3, 1931 |
| 1,904,568 | Taylor | Apr. 18, 1933 |
| 2,418,320 | Simmons | Apr. 1, 1947 |
| 2,474,643 | Webb | June 28, 1949 |
| 2,607,108 | See | Aug. 19, 1952 |
| 2,680,283 | See | June 8, 1954 |